United States Patent [19]

Schneider

[11] Patent Number: 4,563,168

[45] Date of Patent: Jan. 7, 1986

[54] LOAD DISTRIBUTING CHAIN DRIVE ARRANGEMENT

[76] Inventor: Daniel J. Schneider, Rte. 1 Box 81, Justin, Tex. 76247

[21] Appl. No.: 425,379

[22] Filed: Sep. 28, 1982

[51] Int. Cl.[4] .............................................. F16G 13/06
[52] U.S. Cl. ..................................... 474/207; 474/231
[58] Field of Search ............... 474/207, 228, 230, 231; 415/5; 416/7; 384/297, 299, 298

[56] References Cited

U.S. PATENT DOCUMENTS

| | | | |
|---|---|---|---|
| 2,758,814 | 8/1956 | Kratz | 415/5 |
| 2,823,789 | 2/1952 | Henning | 198/131 |
| 3,485,707 | 12/1966 | Spicer | 161/78 |
| 3,537,571 | 11/1970 | Wiese | 198/193 |
| 3,659,472 | 5/1972 | Engels | 74/231 |
| 3,673,883 | 7/1972 | Adams | 74/233 |
| 3,921,932 | 11/1975 | Whitehead, Sr. | 384/297 |
| 4,040,883 | 8/1977 | Matt | 384/298 |
| 4,049,300 | 9/1977 | Schneider | 415/5 |
| 4,117,738 | 10/1978 | McKeon | 474/228 |
| 4,134,842 | 1/1979 | Orkin et al. | 384/297 |
| 4,198,875 | 4/1980 | Schneider | 74/231 |
| 4,319,790 | 3/1982 | Thompson | 384/297 |

FOREIGN PATENT DOCUMENTS

| | | | |
|---|---|---|---|
| 1176766 | 4/1959 | France | 74/231 |
| 44-15704 | 7/1969 | Japan | 474/207 |

Primary Examiner—Stephen J. Novosad
Assistant Examiner—Michael Goodwin
Attorney, Agent, or Firm—Hubbard, Thurman, Turner & Tucker

[57] ABSTRACT

An endless power transmission chain includes link assemblies made up of spaced apart cylindrical pins connected at their opposite ends to parallel outer link plates. Spaced apart inner link plates interconnect the link assemblies and are provided with self-lubricating bearings for journalling the interconnected pins to provide a flexible chain assembly. Chain rollers or bushings of polyurethane or similar resilient non-metal material are rotatably mounted on the link pins between the inner link plates and are directly engageable with the chain sprocket teeth for deflection to provide distribution of chain load over a greater surface area of the sprocket teeth as well as between adjacent teeth engaged with the chain. The chain includes centrally mounted bracket members secured to the link pins for connecting the chain to a series of spaced apart foils or blades for a fluid dynamic power generating apparatus using a translating foil or blade system.

12 Claims, 5 Drawing Figures

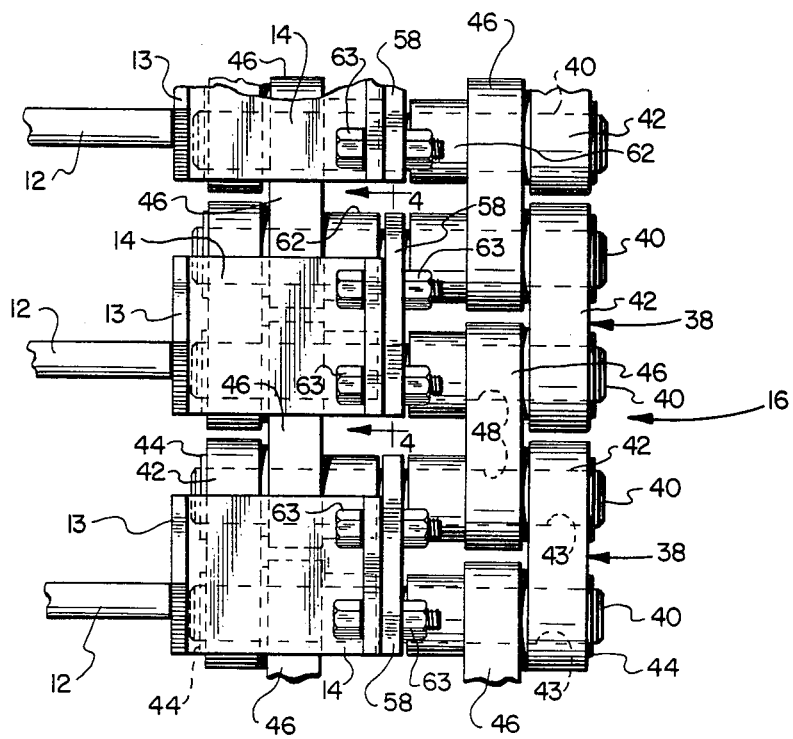
FIG. 3
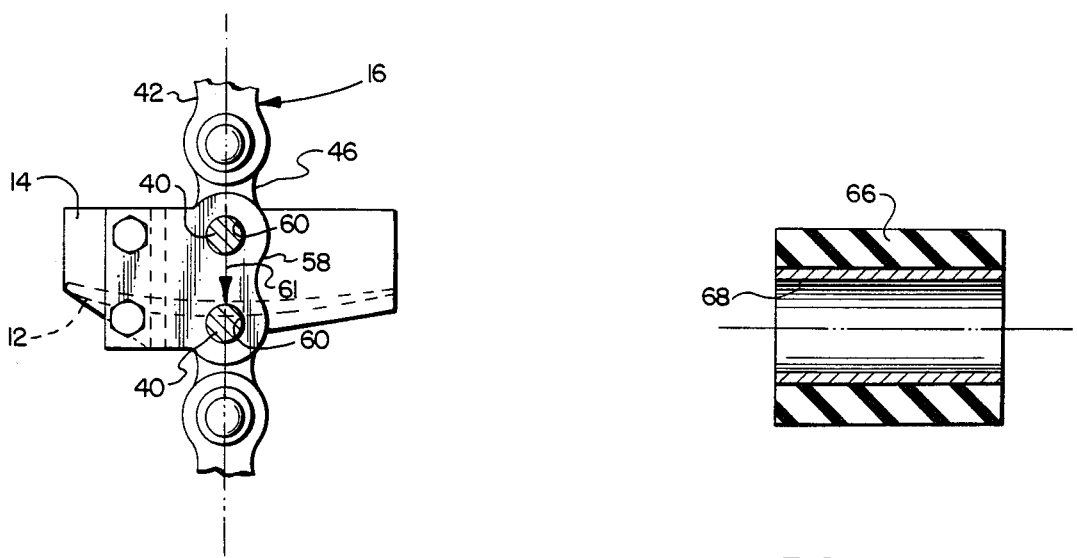
FIG. 4
FIG. 5

# LOAD DISTRIBUTING CHAIN DRIVE ARRANGEMENT

BACKGROUND OF THE INVENTION

1. Field of the Invention

The present invention pertains to an endless power transmission chain drive arrangement including a roller type chain having elastomeric bushings or rollers engageable with the chain sprocket for distributing the driving forces between sprocket teeth, reducing running friction and noise level and being adapted to run in a fluid of relatively low lubricity. The chain drive arrangement is particularly advantageous for use in conjunction with relatively low head fluid dynamic motors.

2. Background Art

Although roller chain drives are well known as power transmitting devices, there are certain disadvantages of conventional roller chains which have been overcome prior to the development of the present invention. For example, conventional roller chains utilize a relatively rigid bushing supporting a rigid roller which is engageable with the sprocket teeth. Practical limitations in the manufacture of conventional roller chains and sprockets require that the sprocket teeth be designed with the assumption that the maximum tensile load on the chain is imposed on one tooth. Even though as a practical matter, tooth and roller deflection permits some distribution of the load amongst the sprocket teeth actually engaged with the chain, this is largely indeterminate in conventional roller chain arrangements and, accordingly, the sprocket must be designed with the assumption that one tooth will experience the maximum chain load.

Moreover, although roller chains are basically low friction mechanical power transmission devices, virtually all applications of roller chains could benefit by improvements in mechanical efficiency as well as noise reduction. There are also several applications of roller chain drives wherein lubrication is a problem and the chain is either arranged such that no lubricant can be applied or the lubricating medium is of relatively low lubricity.

One particularly advantageous application of roller chain drives is in connection with a fluid dynamic or foil type motor for producing power with relatively low fluid heads such as may be found in applications of power production utilizing the hydraulic head in canals or natural streams and rivers. The basic concept of the low head foil type motor is also useful in converting wind energy. Some examples of improved power producing fluid foil type motors are disclosed in my U.S. Pat. No. 4,049,300. Although the improved chain drive of the present invention is particularly advantgeously used with a fluid dynamic foil type motor, the salient features of the invention may be utilized in other types of chain drives.

SUMMARY OF THE INVENTION

The present invention provides an improved endless power transmission chain drive arrangement comprising a flexible chain of the so-called roller type wherein the roller or sprocket tooth engaging element comprises a yieldable material which permits substantial distribution of chain loading among the sprocket teeth which are actually engaged with the chain. In accordance with an important aspect of the present invention, there is provided a power transmission chain having spaced apart cylindrical pins which are interconnected by alternate sets of outer link plates and inner link plates and include an elastomeric roller or bushing mounted directly on the pins for engagement with the sprocket teeth. The elastomeric rollers are preferably formed of a polyurethane elastomer and are snugly fitted on the cylindrical chain pins but are free to rotate with respect to the pins upon engagement with the sprocket teeth.

In accordance with another important aspect of the present invention, there is provided a power transmission chain wherein the inner chain links separately journal the cylindrical pins and are provided with long wear, substantially self-lubricating bearing elements. In a preferred arrangement, the inner links are provided with cylindrical bearings utilizing a glass fiber reinforced PTFE filled composite material which is suitably lubricated by water or other fluids of relatively low lubricity.

The present invention still further provides an improved chain drive arrangement for transmitting a load between the chain and a driving or driven member generally along the longitudinal center line of the chain. In particular, a power transmission chain according to the present invention includes a drive plate or bracket mounted on adjacent chain pins and connected to a power receiving or delivering member monted adjacent to the chain. The particular chain arrangement of the present invention provides for a generally centered longitudinally directed drive load on the chain which is evenly distributed between the chain links and provides for more even distribution of wear on the chain link bearings, the elastomeric rollers and the sprocket teeth.

In accordance with yet other aspects of the present invention, there is provided a power transmission chain arrangement for a fluid dynamic foil type motor which is of high mechanical efficiency, is adequately lubricated by the fluid in which the motor is immersed, is relatively quiet running and distributes the load on the chain sprockets in an improved manner.

Those skilled in the art will recognize further advantages and superior features of the present invention upon reading the detailed description which follows in conjunction with the drawings.

BRIEF DESCRIPTION OF THE DRAWINGS

FIG. 3 is a detail view of a portion of one of the endless chain assemblies taken generally from the line 3—3 in FIG. 1;

FIG. 4 is a detail view taken along the line 4—4 of FIG. 3 illustrating the line of action of forces on the chain assembly; and FIG. 5 is a detail section view of an alternate embodiment of one of the bushings for the chain arrangement of the present invention.

DESCRIPTION OF THE PREFERRED EMBODIMENT

The improved power transmission chain drive arrangement according to the present invention is particularly adapted for use in connection with a power producing device comprising a fluid dynamic motor having a system of foils which provide reaction surfaces for converting the energy of a flowing fluid stream through a mechanical power transmission system. Although the improvements in the transmission chain described herein may also be used in other applications.

Figure 1:
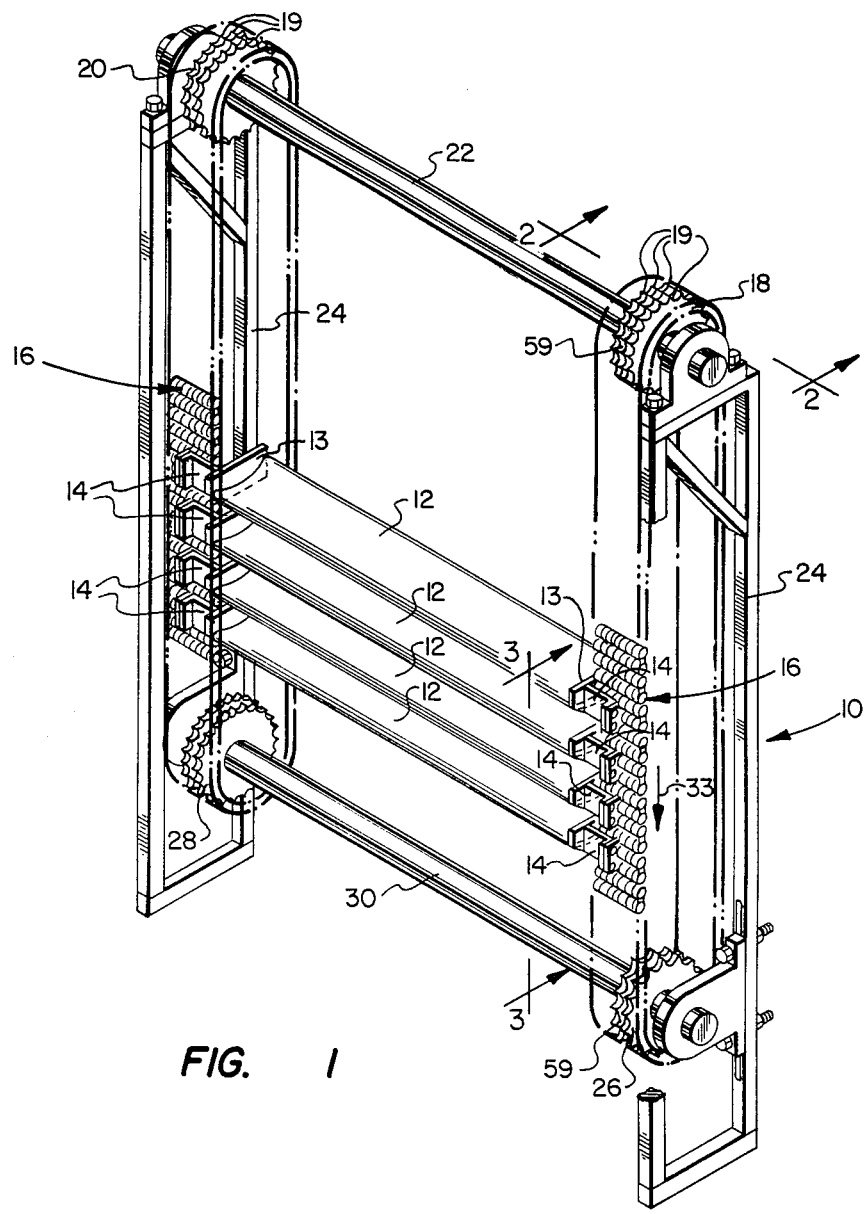
FIG. 1 is a perspective view in schematic form of a fluid dynamic power generating foil system including the improved power transmission chain drive arrangement of the present invention.

Referring to FIG. 1, there is illustrated in schematic form a power producing device, generally designated by the numeral 10, which comprises a system of somewhat airfoil shaped fluid reaction members 12 of which only a representative number are shown. The foils 12 are supported at their opposite ends by opposed longitudinally extending bracket members 14 which are connected in an improved manner to separate, spaced apart endless transmission chains, each generally designated by the numeral 16 in FIG. 1. The chains 16 are each trained over toothed sprockets 18 and 20 which are mounted spaced apart on a shaft 22. The sprockets 18 and 20 may be of the conventional roller chain type having spaced apart radially projecting teeth 19 engageable with the chains 16 in a known way. The shaft 22 is journalled in suitable bearings mounted on spaced apart frame members 24 of the foil motor 10. The chains 16 are also trained around respective spaced apart sprockets 26 and 28 mounted on a shaft 30 which is suitably rotatably journalled on the frame members 24 in a manner similar to the shaft 22.

Further details of the foil motor itself do not comprise a part of the instant invention; however, the transmission chains 16 are particularly adapted to be used in connection with a foil motor which is adapted to generate power from a relatively low head fluid stream flow. My U.S. Pat. No. 4,049,300 discloses and claims a fluid driven foil motor of the general type for which the present invention is particularly adapted. Basically, the foil motor 10 is arranged to be disposed in the path of a fluid stream such as, for example, a canal or other stream conduit to receive water flowing toward the foil system through a set of spaced apart guide vanes, not shown. The force of the flowing water impinging on the foils 12 causes the endless foil system and the chains 16 to translate in the direction of the arrow 33 in FIG. 1 to rotate the shafts 22 and 30. Water flowing through the set of foils of the downwardly moving run illustrated in FIG. 1 is then redirected through a set of guide vanes, not shown, interposed between the oppositely moving runs, to impinge on foils 12 translating along the opposite or upwardly moving course of the endless foil system. Duct work for directing the fluid flow to and through the oppositely moving runs of the foil system of the motor 10 has also been eliminated from the schematic view of FIG. 1 in the interest of clarity and conciseness. Either one or both of the shafts 22 and 30 may be connected to further power transmission means, such as a generator, not shown, for producing power in response to translation of the foil system.

The foil system used in conjunction with the motor 10 is arranged in such a way that conventional lubrication techniques for lubricating the transmission chains 16 are impractical. For example, in many chain drive applications, the chain is disposed within a casing and continually sprayed with or partially immersed in lubricating oil. The arrangement of the foil motor wherein the foils 12 are directly connected to the chains 16 eliminates the possibility of such a type of lubrication system as described above. Moreover, in converting the potential energy of a low head fluid flow stream it is important, as in may other applications of the chains 16, to provide the highest mechanical efficiency possible.

A still further desideratum in the art of power transmission chains, that are connected to drive or be driven by mechanisms that translate along the chain path, is to provide for connecting the chain to the mechanism such that the line of action of the forces on the chain are centered as much as possible. Centering the drive forces reduces or eliminates twisting moments on the chain which induce more rapid wear of the chain and the sprocket teeth. It is in pursuing the abovementioned objectives, as well as other improvements, that the particular transmission chain arrangement of the present invention has been developed.

Figure 2:
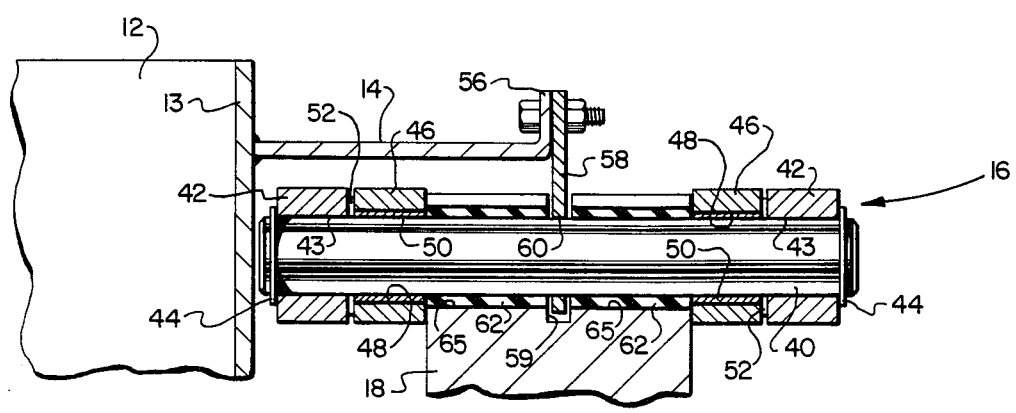
FIG. 2 is a detail transverse section view taken generally along the line 2—2 of FIG. 1 and through a portion of one of the chain sprockets showing the chain engaged therewith.

Referring now to FIGS. 2 and 3, a segment of one of the transmission chains 16 is shown illustrating all of the parts of the chain. Those skilled in the art will appreciate that a complete chain assembly is made up of additional portions of the chain elements illustrated in FIGS. 2 and 3, as needed to provide the desired chain length. Referring particularly to FIG. 3, a portion of one of the chains 16 is shown in vertical elevation. The chain 16 comprises a plurality of interconnected link assemblies 38. Each of the chain link assemblies 38 may be considered to include a pair of spaced apart generally cylindrical pins 40 which are preferably formed of stainless steel or the like and are suitably finished on their exterior cylindrical surfaces to typical journal bearing quality surface smoothness. The pins 40 are connected at their respective opposite ends to outer chain link plates 42 which are each provided with suitable spaced apart bores 43, FIG. 2, for receiving the end portions of the pins 40. The bores 43 in the link plates 42 are preferably sized such that the pins 40 are fitted therein with a moderate press of intereference fit. The opposed ends of the pins 40 are also suitably grooved to receive retaining rings 44 to prevent the link plates 42 from separating from the pins in the event of a loss of the interference fit or excessive lateral forces on the link plates 42.

Each of the link assemblies 38 are interconnected to adjacent link assemblies by a pair of spaced apart inner link plates 46 which are similar in configuration to the link plates 42 and are provided with spaced apart bores 48 having the same distance between bore centerlines as the link plates 42 in accordance with conventional roller chain geometry. However, as shown in FIG. 2, the bores 48 are enlarged for receiving sleeve type bearing members 50 which are preferably press fitted in the bores 48 and are adapted to rotatably journal the cylindrical pins 40. Accordingly, the repeated interconnection of the link assemblies 38 by the inner link plates 46 provides for a flexible chain assembly since the link plates 46 are rotatable with respect to the pins 40.

As shown in FIG. 2, the chain assembly 16 is also provided with generally cylindrical flat bearing washers 52 disposed around the pins 40 and interposed between adjacent sides of the link plates 42 and 46. The bearing washers 52 may be made of the same material as the cylindrical bearing members 50.

Since the chain assembly 16 is adapted to operate in an environment wherein conventional lubricants may not be utilized, the selection of the bearing material for the bearings 50 and 52 is of particular concern. It has been determined that a preferred material for the bearings 50 and 52 is a filament wound composite structure preferably having interspersed therein particles of a material having good lubricity such as PTFE (polytetrafluoroethylene). A suitable material is manufactured under the trademark GAR-FIL by Garlock Bearings, Inc., Thorofare, N.J. Although other self-lubricating or water lubricated bearing materials may be used, the abovementioned material is particularly suited for one of the important applications of the chain assembly 16 described herein.

FIGS. 2, 3 and 4 also illustrate details of the arrangement for connecting the opposite ends of the foils 12 to the respective chain assemblies 16. Each of the foils 12 is provided with opposed transverse end plates or rib portions 13 from which extend the support brackets 14. As shown by way of example for one end of one of the foils 12, in FIG. 2, the brackets 14 are suitably fixed to the ribs 13 such as by welding or the like. The bracket 14 includes a transverse flange portion 56 adapted to secure the bracket to a support bracket member 58 which is provided with a pair of spaced apart bores 60, FIG. 4. In FIG. 4, the outboard inner link 46 and outer link 42 has been removed to show details of one of the brackets 58. The bracket members 58 are adapted to mount on the pins 40 and the bores 60 are sized such that a light press or interference fit of the pins 40 within the bores is provided. Moreover, as will be noted viewing FIGS. 2 and 3, the bracket member 58 is centered with respect to the lateral width of the chain assembly 16 so that the forces transmitted from the foils 12 to the chain assemblies are applied along a plane substantially perpendicular to the longitudinal axes of the pins 40 and located at the transverse midpoint of the chain assemblies 16. With this arrangement of the force transmitting bracket members 58 there is essentially no tendency for the chain assembly to skey or yaw as it translates and engages the respective sprockets. The brackets 58 are suitably secured to the bracket members 14 by bolt and nut assemblies 63 as illustrated.

As will be noted also viewing FIG. 4, the foils 12 are configured such that the center of lift or the resultant fluid reaction force acting on the foils is directed generally along a line 61 which lies in a plane passing through the central axis of the pins 40 when the foils are translating between the spaced apart shafts 22 and 30. The line 61 also coincides with the pitch line of the chain assemblies 16.

Referring further to FIG. 2, a portion of the sprocket 18 is illustrated in total engagement with a portion of one of the chain assemblies 16. The sprocket 18, as well as the sprockets 20, 26 and 28 are each provided with a central peripheral groove 59 to provide clearance for the brackets 58.

A longstanding problem in the art of roller type power transmission chains pertains to the indeterminate distribution of loading between the teeth of the sprockets which are engaged with the chain as the sprocket rotates its teeth into and out of engagement with the chain rollers or pin members. In this regard, roller chain sprockets are designed with the assumption that a single tooth must endure the maximum chain load since practical dimensional tolerances result in errors in sprocket tooth spacing and chain link spacing. Moreover, it is also difficult to determine the amount of tooth and chain link deflection with accuracy. In certain applications where lubrication is lacking or the lubricity of the fluid available is relatively low, high rates of wear will also be experienced between chains and sprockets when using conventional chain materials such as steel and other engineering metals. In accordance with the present invention, however, the chain assemblies 16 are provided with bushing means directly engageable with the sprocket teeth and which are preferably made of a resilient non-metallic material which is deflectable under load so that relative movement between adjacent sprocket teeth and adjacent pins 40 along the pitch line may take place to provide for distributing the chain load between sprocket teeth which are engaged with the chain. As shown in FIGS. 2 and 3, each of the pins 40 includes a pair of spaced apart cylindrical bushings 62 mounted in sleeved relationship over the pins and between the link plates 46. The bushings 62 are preferably formed of a resilient polyurethane elastomer, the hardness of which may be selected in accordance with the unit stress imposed on the bushings as determined by the design load of the chain and the sprocket dimensions. A preferable hardness for the polyurethane for a chain having two inch pitch and a pin diameter of 1.25 inches is a hardness of D50 as measured on the Shore scleroscope. The bushings 62 are preferably dimensioned such that they are in snug fitting but rotatable relationship with respect to the cylindrical surface of the pins 40.

The outside diameter of the bushings 62 is, of course, selected in conformance with the geometry of the grooves or recesses formed between adjacent teeth of the sprockets such as the sprocket 18 so that a full seating of the bushings in a tooth recess 65 is obtained, as shown in FIG. 2. In this regard, the provision of the resilient bushings 62 overcomes a problem with roller chain drives wherein, if the tooth spacing is undersize, concentrated loading and bending stresses on the teeth are experienced and result in early chain and/or sprocket failure. However, the resilient deflection of the bushings 62 permits substantially full seating of the chain as it passes over the sprocket.

The provision of the resilient tooth engaging bushings 62 for the chain assemblies 16 also reduces the noise generated by the chains due to engagement and disengagement of the bushings or rollers with respect to the sprockets. Most importantly, however, the load distribution provided by the resiliently deflectable or deformable bushings reduces stresses previously encountered with prior art roller chains due to errors in sprocket geometry or chain pin spacing. Furthermore, the elastomeric bushings 62 require minimal lubrication, or at least receive adequate lubrication using fluids of low lubricity.

Although for many applications, the bushings 62 may be provided without an inner bearing sleeve member for some applications for relatively large chain assemblies or chains subject to high loading conditions, it may be preferable to provide a bushing constructed in accordance with the detail illustration of FIG. 5. FIG. 5 illustrates a bushing 66 of the type to be used in conjunction with a chain assembly such as the chain assembly 16 except that the bushing 66 includes an inner bearing sleeve 68 which may be formed of a substantially rigid metal selected from one of the suitable steel or bronze bearing metals. Bushings such as the bushing 66 are preferably used where the unit stress on the bushing is such that deformation of the bushing would result in accelerated wear on the bushing or the pin journalled thereby.

Those skilled in the art will appreciate from the foregoing that a particularly improved power transmission chain arrangement has been provided which is adapted to be connected to driving or driven means which translate along the path of the chain whereby power may be delivered to or taken off of the chain drive assembly by a rotating shaft and sprocket arrangement. The improved roller or bushing arrangement is particularly advantageous for distribution of loading amongst the interengaged sprocket teeth and chain linkage. Moreover, the arrangement of connecting the foils or blades of the foil system described herein assures that the loads transmitted from the foils to the transmission chains are directed along a central plane substantially perpendicular to the length of the chain pins whereby any tendency for the chain to be skewed with respect to the drive sprockets is eliminated.

Various substitutions and modifications may be made to the specific embodiment of the invention disclosed herein without departing from the scope and spirit of the appended claims.

What I claim is:

1. An endless power transmission chain adapted for transmitting power from a fluid dynamic foil system to at least one rotatable sprocket member having a plurality of spaced apart generally radially projecting teeth, said chain comprising:
   a plurality of interconnected chain links formed by pairs of spaced apart cylindrical pins, each of said pins being connected at their respective opposite ends to respective ones of a pair of outer chain link plates;
   each of said links being connected to an adjacent link by pairs of inner chain link plates journalling said pins between said outer link plates, ones of said pairs of outer link plates and said inner link plate means being rotatable with respect to said pins to form a flexible chain; and
   resilient non-metal cylindrical tubular bushings mounted on said pins between said inner link plates for direct engagement with said sprocket teeth whereby deflection of one or more bushings under forcible engagement with said teeth provides for distribution of chain driving forces between said teeth engaged with said chain, said bushings being formed of a material which is sufficiently lubricated by water as to provide minimal wear on said bushings and said sprocket during said engagement.

2. The transmission chain set forth in claim 1 wherein: said bushings are made of polyurethane.

3. The transmission chain set forth in claim 2 wherein: said bushings include a substantially rigid bearing sleeve rotatably disposed on said pins and supporting a resilient outer bushing part.

4. The transmission chain set forth in claim 1 wherein: said pins are non-rotatable with respect to said outer link plates, and said inner link plates include bearing means disposed in said bores in said inner link plates and journalling said pins.

5. The transmission chain set forth in claim 4 wherein: said bearings are of a material which may be lubricated by water when engaged with pins made of stainless steel.

6. The transmission chain set forth in claim 5 wherein: said bearings are made of a filament wound composite material.

7. The transmission chain set forth in claim 4 together with:
   bearing means interposed between adjacent sides of said inner link plates and said outer link plates.

8. The transmission chain set forth in claim 1 wherein: said chain includes a plurality of spaced apart brackets secured to said chain and respective foils of said foil system.

9. The transmission chain set forth in claim 8 wherein: said brackets each include a pair of spaced apart bores for mounting said brackets on said adjacent pins of said links.

10. The transmission chain set forth in claim 9 wherein: said brackets comprise bracket plates disposed on said pins substantially midway between said outer link plates, said bushing means comprise bushings mounted on said pins on opposite sides of said bracket plates, and said sprocket includes a central peripheral groove providing clearance for said bracket plates while said chain is engaged with said sprocket.

11. An endless power transmission chain for transmitting power from a fluid dynamic foil system to at least one rotatable sprocket member having a plurality of spaced apart generally radially projecting teeth, said chain comprising:
   a plurality of interconnected chain links formed by pairs of spaced apart cylindrical pins, each of said pins being connected at their respective opposite ends to respective ones of a pair of outer chain link plates;
   each of said links being connected to an adjacent link by inner chain link plate means journalling said pins between said outer link plates, ones of said pairs of outer link plates and said inner link plate means being rotatable with respect to said pins to form a flexible chain;
   resilient non-metal bushings mounted on said pins for direct engagement with said sprocket teeth whereby deflection of one or more of said bushings under forcible engagement with said teeth provides for distribution of chain driving forces between said teeth engaged with said chain; and
   a plurality of spaced apart brackets secured to said chain and respective foils of said foil system, said brackets each including bores for mounting said brackets on and supported by said pins of said links substantially midway between said outer link plates so that forces acting on said chain due to said foils are directed along a longitudinal central plane midway between said link plates to minimize skewing forces on said chain with respect to the direction of travel of said chain, said bushings being mounted on said pins on opposite sides of said brackets.

12. In combination: an endless power transmission chain adapted for transmitting power from a fluid dynamic foil system to at least one rotatable sprocket member having a plurality of spaced apart generally radially projecting teeth, said chain comprising:
   a plurality of interconnected chain links formed by pairs of spaced apart cylindrical pins, a pair of outer chain link plates connected to each of said pins at respective opposite ends of said pins, each of said links being connected to an adjacent link by inner chain link plate means journalling said pins between said outer link plates, ones of said pairs of outer link plates and said inner link plate means being rotatable with respect to said pins to form a flexible chain,
   said foil system comprising a set of spaced apart foils connected to said chain at least at one end of respective ones of said foils by bracket means interconnecting said foils and said chain,
   said bracket means including means for mounting said bracket means on said pins substantially midway between opposite ends of said pins in such a way that the line for force acting on said chain due to said foils is directed substantially along a longitudinal central plane midway between opposite lateral sides of said links, said bracket means further including bore means for journalling said pins, respectively, to interconnect said chain and said foils in such a way that a resultant lift force acting on said foils due to fluid flowing over said foils is directed substantially along the pitch line of said chain.

* * * * *